United States Patent [19]

Larson

[11] Patent Number: 5,041,158

[45] Date of Patent: Aug. 20, 1991

[54] POWDERED METAL PART

[75] Inventor: Jay M. Larson, Marshall, Mich.

[73] Assignee: Eaton Corporation, Cleveland, Ohio

[21] Appl. No.: 551,351

[22] Filed: Jul. 12, 1990

Related U.S. Application Data

[63] Continuation-in-part of Ser. No. 924,452, Oct. 29, 1986, abandoned.

[51] Int. Cl.$^5$ .............................................. C22C 29/00
[52] U.S. Cl. ....................................... 75/231; 75/230; 75/246; 419/10; 419/11; 419/36; 419/37; 419/38
[58] Field of Search .......................... 75/230, 231, 246; 419/10, 11, 36, 37, 38

[56] References Cited

U.S. PATENT DOCUMENTS

| | | | |
|---|---|---|---|
| 3,122,505 | 2/1964 | Rulon-Miller et al. | 75/231 |
| 4,274,875 | 6/1981 | Cadle et al. | 75/232 |
| 4,569,693 | 2/1986 | Albrecht et al. | 419/19 |

FOREIGN PATENT DOCUMENTS

| | | |
|---|---|---|
| 068707 | 6/1979 | Japan . |
| 5739304 | 6/1979 | Japan . |
| 273434 | 9/1970 | U.S.S.R. . |

*Primary Examiner*—Brooks H. Hunt
*Assistant Examiner*—Leon Nigohosian, Jr.
*Attorney, Agent, or Firm*—A. E. Chrow

[57] ABSTRACT

Powdered metal parts, especitally valve parts of an internal combustion engine which are subject to adhesive wear in service, withstand such wear substantially better when they have substantially uniformly dispersed through them from about 0.75% to about 7.0% by weight of hydrate magnesium silicate (talc).

9 Claims, No Drawings

POWDERED METAL PART

This invention is a continuation-in-Part of Patent Application Ser. No. 924,452 filed Oct. 29, 1986, now abandoned.

TECHNICAL FIELD

The present invention relates generally to powder metallurgy, and more specifically to powdered metal parts, especially engine parts such as valve seat inserts and valve guides that contain solid lubricant.

BACKGROUND ART

Adhesive wear between relatively movable parts made by powder metallurgy has remained a persistant problem in spite of prior art attempts to produce parts which contain a solid lubricant. The problem of adhesive wear occurs, for example, in connection with powdered metal engine parts, such as between valve guides and valve stems and between valve seat inserts and valve seat faces operating at high temperatures often in excess of 500° F. It is particularly severe in heavy duty and natural gas engines. As diesel engines go to higher combustion peak pressures, the adhesive wear condition will be even more aggravated.

U.S. Pat. No. 4,274,875 discloses one prior art proposal for making a pre-lubricant powdered metal part such as a valve seat insert. As disclosed in the patent, powdered mica is included in a metal powder mixture prior to compacting and sintering the compact. Other conventional additives that have been proposed include molybdenum disulfide, bismuth, tin, lead, copper and phosphorus.

U.S. Pat. No. 4,569,693 discloses the addition of up to 0.5% by weight of finely divided extraneous metal oxides such as amorphous pyrogenic silica ($SiO_2$), amorphous alumina, titanium dioxide, talc (hydrated magnesium silicate) or magnesium oxide and combinations thereof to powdered tantalum or niobium to improve the free flowability of the powdered metal before compacting and sintering the powdered mixture into electrical anodes.

U.S. Pat. No. 4,154,609 discloses the addition of from about 0.01 to about 10% by weight of at least one organic lubricant selected from sulfides, selenides and tellurides of a member of sub-groups V and VI of the periodic table as an inorganic lubricant for making molded anodes.

Although heretofore used in small amounts to improve flowability of powdered metal, no one prior to the present invention recognized the marked effect that the addition of greater amounts of powdered hydrated magnesium silicate (talc) would have in reducing seizing and scuffing of powdered metal parts such as valve seat inserts and valve guides operating at high temperatures in internal combustion engines.

DISCLOSURE OF THE INVENTION

Accordingly, the present invention provides an improved solution to the problem of adhesive wear encountered with powdered metal parts, especially valve and other engine parts.

According to the invention talc in powder form is added to a metal powder mixture during the blending stage (that is, in the preparation of the die charge).

During use, the exposed surface of the powdered metal part is worn away by adhesive wear. Pockets of the solid lubricant are spread over the exposed surface to reduce further wear. In addition to reducing adhesive wear, the addition of talc improves machinability, such as reaming of valve seat inserts when assembled in a cylinder head and also improves powder compaction as might be expected from the prior art.

In preferred embodiments of the invention, the solid lubricant is added to the powder metal mixture with a preferred operating amount being in a range of from about 2.0 to about 6.0%, and still more preferably from 2.5 to 4% which is substantially higher than taught by the prior art for the addition of talc. In the case of valve guides, a preferred addition is from about 1 to 3%, and in the case of valve seat inserts a preferred addition ranges from about 1.0 to about 4% by weight to the total weight of the powdered metal.

In this specification unless otherwise specified all mesh sizes are of the U.S. Standard Sieve Series, all temperatures are in degrees Fahrenheit, and all percentages are weight percentages.

In accordance with the foregoing, the invention provides a process for making a pre-lubricated, powdered metal part, especially an engine valve component, comprising the steps of blending a metal powder with talc, compacting the blend to form a green compact, and sintering the compact.

The invention also provides a powdered metal part, especially an engine valve component such as a valve seat insert, a valve guide and the like, characterized by the presence of substantially uniformly dispersed powdered talc in an amount substantially greater than heretofor taught by the prior art.

Other features and advantages, and a fuller understanding of the invention will be had from the following detailed description.

BEST MODE FOR CARRYING OUT THE INVENTION

Insight into the efficacy of the instant invention can be gained by considering the properties of the solid lubricant talc. Talc, $Mg_3Si_4O_{10}(OH)_2$, is hydrated magnesium silicate mineral. Its hardness is one on the Mohs Scale. It is softer than mica Talc's extreme softness and lubricating qualities make it the most highly preferred of the solid lubricants.

Unlike the case of graphite and some other conventional solid lubricants, the useful amount of talc need not be narrowly limited because there is no significant interaction with iron and can be added in much higher amounts than expected.

Consistent with conventional powder metallurgy practice, the preferred particle size of the solid lubricants is quite small. A preferred talc for present purposes has an average particle size of 32 microns and is called "200 mesh size" in the trade. An even finer grade, e.g., one having 20 micron average size, or a coarser grade, e.g., one having 40 micron average size, also is feasible. While the foregoing particle sizes have been stated in order to disclose best modes for carrying out the invention, it is to be understood that the size ranges can be varied within the skill of the art depending upon particular applications.

Whereas the solid lubricant used in this invention survives sintering to exert its special lubricating effects in adhesive wear service, fugitive die lubricants, i.e., ones that decompose and at least partially vaporize during sintering, have their place in the present processing. Thus, it is desirable to use about 0.25-2% and preferably about 0.5-1% of a fugitive die lubricant well blended into the die charge. Representative of such fugitive die lubricants are stearates and stearamides such as zinc or lithium stearate or ethylene bis stearamide.

When temperatures above about 100° F. are a consideration, it is possible to include in the metal powder blend powdered manganese sulfide MnS in addition to talc. It is contemplated that manganese sulfide, if used, will be in the same proportions as the talc lubricant. The blend of metal and other powders including all lubricants must be an intimate one to provide substantial uniformity in the resulting sintered compact.

Compaction is done generally with a die of desired shape. In the case of iron-based metal powders for making valve parts, the lubricated blend of powder is pressed to at least about 20 tons per square inch generally higher, e.g., 40-60 tons per square inch. While sintering can be done between about 1940° F. and about 2250° F. in a protective atmosphere (preferably hydrogen or dissociated ammonia having a dew point of −28° F. or lower), the preferred temperature for efficiency and economy is about 2100° F. Thirty minutes at the peak temperature appears to be adequate and economical for sintering. The sintered compact emerges with the talc inact. The fugitive lubricant that aided so well in the compacting has been dissipated or otherwise rendered ineffective.

In the manufacture of valve guides, the blend for pressing is made up typically with about 0.25-1% of an ethylene stearamide or like fugitive lubricant and about 0.75-7.0%, and preferably about 1.0-6% and even more preferably about 1.0-5% talc. Valve seat inserts are made using the same amount of such stearamide or like lubricant and 0.25-4%, preferably 1.0-4.0% talc blended with austenitic stainless steel powder and a softer ferrous metal powder. The preparation of such an article (not lubricated with talc) is further described in U.S. Pat. No. 4,724,000 issued on Feb. 9, 1988 entitled "Powder Metal Valve Seat", Ser. No. 924,348, commonly assigned to the Assignee of the present invention.

EXAMPLE I

In one example of the invention, a powder blend was prepared containing about 1.0-2.0% C, 9.0-11.0% Cr, 0.5% max. Mo, 0.5-1.5% Ni, 0.2% max. Si, 2.0-5.0% Cu, 3.0-5.0 Mn, 0.5-1% talc, and the balance iron. An ethylene stearamide mold lubricant wax was added to the blend in an amount of about 0.75% based on the weight of the unlubricated blend.

The resulting lubricated blend was pressed at 40-42 tons per square inch to form green compacts for exhaust valve seat inserts about 2" in diameter. The green inserts were sintered for 3 hours in a furnace maintained at 2100° F. (the compacts being at furnace temperature for about ½ hour). Furnace atmosphere was dissociated ammonia having a dewpoint of −28° F.

| Density of green compact, grams per cc | 6.2 |
| Density of sintered compact, grams per cc | 6.11 |
| % of theoretical full density, as sintered | 80 |
| As sintered hardness, Rockwell B, apparent | 70 |
| Aged* hardness, Rockwell B, apparent | 90 |
| Ultimate tensile strength, (KSI) | 42-44 |

Another set of exhaust valve seat inserts was made in the same manner except that the talc was eliminated from the blend.

The lubricated and unlubricated inserts were subjected to a seat wear testing designed to simulate seat wear under operating conditions. A valve seat insert lubricated with talc had 0.002 inches of wear compared to 0.012 inches of wear for an unlubricated insert.

EXAMPLE II

In another example of the invention, a powder blend was prepared containing about 92% Fe, 2% C, 5% Cu, and 1% talc. Valve guides were made from the blend following the general procedure described in Example I. Unlubricated valve guides were made from the same blend except for the elimination of the talc.

The lubricated and unlubricated guides were subjected to a valve stem scuffing rig designed to simulate wear of guides against valve stems under operating conditions.

The typical time to seizure for unlubricated guides was about 2 hours. No seizuring of the lubricated guides occurred after 100 hours of testing.

EXAMPLE III

In yet another example a sintered powdered metal valve guide made from a powder blend by weight 4% Cu, 1% carbon, and the balance Fe, with none and three (3%) talc where tested according to the following procedure:

1. The valve guide is inserted in a water cooled simulated cylinder head.
2. The bottom end of the guide is heated to 550° F. by a coil heater. Thermocouple monitors actual temperature and controls to ±1° F.
3. The stem is heated to 550° F. to simulate heat flow from the valve head. Temperature is controlled to ±1° F. The stem is precoated with a thin layer of engine oil by dipping and draining for a fixed period of time.
4. the stem is traversed up and down within the guide by an actuator from a hydraulic test machine. The stroke is controlled at 0.350 inch. The frequency of the harmonic motion is 10 HZ.
5. The stem is pushed down against a return spring similar to the typical valve spring.
6. The stem is loaded on the side to 50 lbs. simulating rocker arms side loads in an engine.
7. The stem axial and side loads are measured continuously. The axial position of the stem is monitored by the proximity indicator which acts as position sensitive electromagnetic device.
8. Complete seizure of the stem in the guide is indicated by minimum voltage from the proximity indicator. The stem becomes visibly stationary being unable to overcome the return spring load when seizing occurs.
9. The time taken for complete seizure is noted and reported.

Testing according to the above described procedure produced the following results:

| GUIDE TYPE | STEM TYPE | TIME TO SEIZURE (minutes) |
| --- | --- | --- |
| Standard P/M Composition with No Talc | Hard Cr Plate | 10 |
| Standard P/M Composition with No Talc | Hard Cr Plate | 21 |
| Standard P/M Composition with | Hard Cr Plate | 8 |

| GUIDE TYPE | STEM TYPE | TIME TO SEIZURE (minutes) |
|---|---|---|
| No Talc Standard P/M Composition with 3% Talc | Hard Cr Plate | 91 |
| Standard P/M Composition with 3% Talc | Hard Cr Plate | 67 |

NOTE: All P/M guides were de-oiled prior to testing in order remove the effect of oil impregnation on the results.

Clearly, a more than threefold increase in time to seizure is achieved with the addition of 3% talc.

EXAMPLE IV

In this example, 13 blends of Iron base EMS 612 powder were made, pressed to an aim density of 6.5 g/cc and sintered. The guide set 1 had no talc and sets 2 thru 7 had increasing levels of talc as shown in example I. Guide Sets beyond 7 were dropped from further investigations, as the presence of 10% of talc in the blend made it impossible to press without delaminations and tool breakage. The sintered guides were impregnated under identical conditions with bright stock based oil and coined to size and to form end chafers. All guides were reamed under identical conditions.

Three guides from each talc level were tested against hard Chromium plated EMS 209 (SAE 1547) steel valve stems (Rc 35-40). The following test parameters were used for all tests:
1. Stem side Load: 50 lbs.
2. Stem hot end temp.: 530 degrees F.
3. Guide hot end temp.: 550 degrees F.
4. Prelub (stem): Light SAE SG 30w oil dip These test conditions were chosen to simulate the most severe exhaust valve guide hot end conditions, in which the engine oil loses it lubricating effectiveness due to decomposition. The time to seizure (or sticking of the stem) was monitored by the proximity pickup which sensed the motion of the valve stem.

RESULTS:
1. The following shows the seizure life of each guide tested for each talc level.
2. Also shown in this table are the minimum life and average life and average density for each talc level.
3. An increase in seizure resistance is indicated by a general increase in talc content. This increase in seizure life is believed to be associated with a) friction reduction by talc particles that shear along basal planes, and b) the non-metallic interface provided by the talc prevents metal-to-metal contact between the guide and valve stem surface and thus minimizes adhesion and sticking.

| GUIDE # | TALC % Wt. % | DENSITY g/cc | LIFE hrs. | MIN LIFE hrs. | MEAN LIFE hrs. |
|---|---|---|---|---|---|
| (Three specimens in each group) | | | | | |
| 1.1 | | | 7.8 | | |
| 1.2 | | | 13.7 | | |
| 1.3 | | | 11.8 | | |
| | 0.00 | 6.56 | | 7.80 | 11.10 |
| 2.1 | | | 9.8 | | |
| 2.2 | | | 9.8 | | |
| 2.3 | | | 20.0 | | |
| | 0.10 | 6.57 | | 9.80 | 13.20 |
| 3.1 | | | 15.8 | | |
| 3.2 | | | 14.6 | | |
| 3.3 | | | 12.8 | | |
| | 0.25 | 6.58 | | 12.80 | 14.73 |
| 4.1 | | | 18.5 | | |
| 4.2 | | | 20.1 | | |
| 4.3 | | | 13.1 | | |
| | 0.50 | 6.59 | | 13.10 | 17.23 |
| 5.1 | | | 11.9 | | |
| 5.2 | | | 20.8 | | |
| 5.3 | | | 30.7 | | |
| | 1.00 | 6.60 | | 11.90 | 21.13 |
| 6.1 | | | 21.8 | | |
| 6.2 | | | 12.6 | | |
| 6.3 | | | 11.2 | | |
| | 3.00 | 6.54 | | 11.20 | 15.20 |
| 7.1 | | | 28.5 | | |
| 7.2 | | | 24.0 | | |
| 7.3 | | | 29.9 | | |
| | 7.00 | 6.18 | | 24.00 | 27.47 |

In the above data, the minimum life plot shows a dip in the seizure life at the 3.0% level of talc which is not completely understood but interpreted to be due to the influence of talc in occupying pore sites and making less pores available to oil lubricant. With higher talc levels, the seizure life increases as more talc not associated with pores is made available for friction reduction.

Clearly, talc addition will provide significant wear protection under dry wear conditions which is extremely crucial in new engine designs characterized by higher speed and temperature of operation as well as operating conditions associated with tight valve stem seals for emission reduction. Many modifications and variations of the invention will be apparent to those skilled in the art in light of the foregoing disclosure. Therefore, it is to be understood that, within the scope of the appended claims, the invention can be practiced otherwise than as specifically set forth herein.

What is claimed is:

1. A powdered metal part comprising a sintered compact of iron-based metal powder, said part having improved resistance to adhesive wear provided by said compact prior to sintering including by weight from about 1.0% to about 2.0% carbon and from about 0.75% to about 7.0% talc of the total weight of the compact dispersed as a solid lubricant substantially uniformly therethrough.

2. The part of claim 1 which is a valve seat insert for an internal combustion engine.

3. The part of claim 1 which is a valve seat guide for an internal combustion engine.

4. The part of claim 1 wherein said carbon is in the form of graphite form.

5. The part of claim 1 wherein said powdered metal comprises austenitic stainless steel.

6. In a process for making an iron-based powdered metal part wherein a die charge comprising metal powder including about 1.0% to about 2.0% by weight carbon is pressed into a green compact and said green compact is sintered to provide a sintered compact, said part having improved resistance to adhesive wear as a result of said process including the step of dispersing in the die charge from about 0.75% to about 7.0% by weight talc of the total weight of the die charge as a solid lubricant.

7. The process of claim 6 wherein said part is a valve seat insert for an internal combustion engine.

8. The process of claim 6 wherein said part is a valve guide for an internal combustion engine.

9. The process of claim 6 wherein the die charge includes by weight of from about 0.25% to about 2.0% of the total weight of the die charge of a fugitive die lubricant.

* * * * *